US012580485B2

(12) United States Patent
Jung et al.

(10) Patent No.: US 12,580,485 B2
(45) Date of Patent: Mar. 17, 2026

(54) PSEUDO-EMULATED PEAK CURRENT MODE FOR THREE-LEVEL BUCK CONVERTER

(71) Applicant: QUALCOMM Incorporated, San Diego, CA (US)

(72) Inventors: Sanghwa Jung, Los Gatos, CA (US); Stuart Pullen, Carolina Beach, NC (US)

(73) Assignee: Qualcomm Incorporated, San Diego, CA (US)

( * ) Notice: Subject to any disclaimer, the term of this patent is extended or adjusted under 35 U.S.C. 154(b) by 247 days.

(21) Appl. No.: 18/465,019

(22) Filed: Sep. 11, 2023

(65) Prior Publication Data

US 2025/0088105 A1     Mar. 13, 2025

(51) Int. Cl.
*H02M 3/157* (2006.01)
*H02M 3/158* (2006.01)
*H02J 7/00* (2006.01)
(52) U.S. Cl.
CPC ........... *H02M 3/158* (2013.01); *H02M 3/157* (2013.01); *H02J 7/007* (2013.01); *H02J 2207/20* (2020.01)
(58) Field of Classification Search
CPC .... H02M 3/158; H02M 3/155; H02M 3/1552; H02M 3/156; H02M 3/1563; H02M 3/1566; H02M 3/157; H02M 3/1582; H02M 3/1584; H02M 3/1586; H02J 2207/20
See application file for complete search history.

(56) References Cited

U.S. PATENT DOCUMENTS

2021/0152100 A1* 5/2021 Zilio ................... H02M 7/4837

OTHER PUBLICATIONS

International Search Report and Written Opinion—PCT/US2024/045992—ISA/EPO—Dec. 2, 2024.
Lu L., et al., "Digital Average Current Programmed Mode Control for Multi-level Flying Capacitor Converters", IEEE 19th Workshop on Control and Modeling for Power Electronics (COMPEL), Jun. 25, 2018, 7 Pages, XP033402372, abstract, figure 8.
Lu L., et al., "Peak Offsetting Based CPM Controller for Multi-level Flying Capacitor Converters", IEEE Applied Power Electronics Conference and Exposition (APEC), Mar. 4, 2018, pp. 3102-3107, XP033347678, abstract, Section II B. Peak Offsetting CPM Control, figures 1-5.

* cited by examiner

*Primary Examiner* — Nguyen Tran
(74) *Attorney, Agent, or Firm* — Patterson & Sheridan LLP

(57) ABSTRACT

Certain aspects of the present disclosure generally relate to techniques for operating a three-level buck converter. An example method for operating the three-level buck converter may include: identifying a voltage value based on an input voltage of the three-level buck converter; determining an emulated current for an inductive element of the three-level buck converter based on an expression having a variable associated with a voltage across a flying capacitive element of the three-level buck converter, wherein determining the emulated current comprises assuming the variable to have the voltage value; comparing the emulated current to a threshold; and controlling at least one transistor of the three-level buck converter based on the comparison.

30 Claims, 8 Drawing Sheets

800

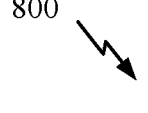

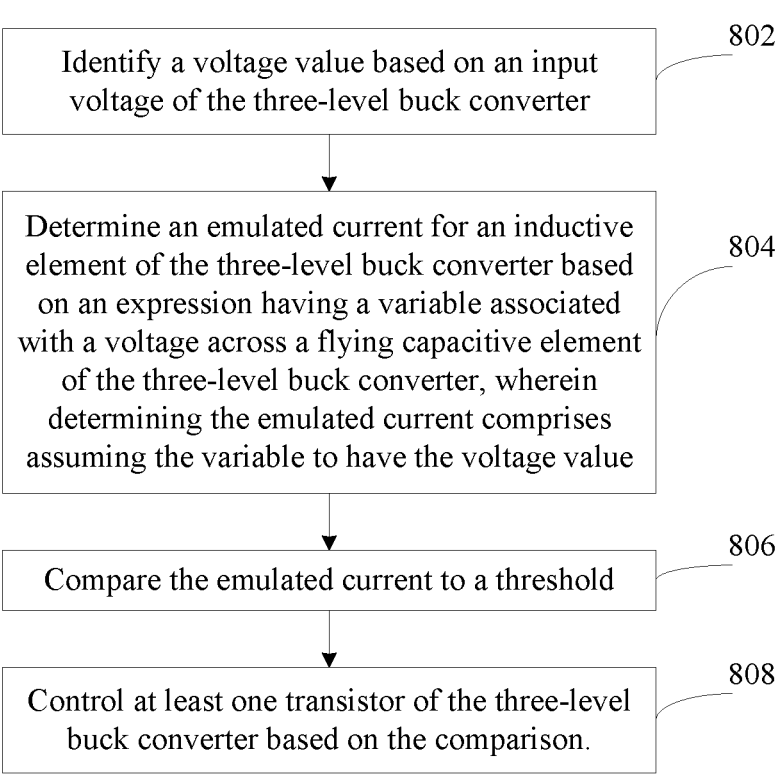

Identify a voltage value based on an input voltage of the three-level buck converter    802

Determine an emulated current for an inductive element of the three-level buck converter based on an expression having a variable associated with a voltage across a flying capacitive element of the three-level buck converter, wherein determining the emulated current comprises assuming the variable to have the voltage value    804

Compare the emulated current to a threshold    806

Control at least one transistor of the three-level buck converter based on the comparison.    808

FIG. 8

PSEUDO-EMULATED PEAK CURRENT MODE FOR THREE-LEVEL BUCK CONVERTER

TECHNICAL FIELD

Certain aspects of the present disclosure generally relate to electronic circuits and, more particularly, to a three-level buck converter.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS that may include: (1) a high-side switch coupled between a relatively higher voltage rail and a switching node, (2) a low-side switch coupled between the switching node and a relatively lower voltage rail, (3) and an inductor coupled between the switching node and a load. The high-side and low-side switches are typically implemented with transistors, although the low-side switch may alternatively be implemented with a diode.

Power management integrated circuits (power management ICs or PMICs) are used for managing the power scheme of a host system and may include and/or control one or more voltage regulators (e.g., buck converters and/or LDOs). A PMIC may be used in battery-operated devices, such as mobile phones, tablets, laptops, wearables, etc., to control the flow and direction of electrical power in the devices. The PMIC may perform a variety of functions for the device, such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure are directed toward a power supply circuit. The power supply circuit generally includes: a first transistor and a second transistor coupled between an input node of the power supply circuit and a switching node of the power supply circuit, the switching node being coupled to an inductive element; a third transistor and a fourth transistor coupled between a reference potential node of the power supply circuit and the switching node of the power supply circuit; a flying capacitive element coupled between the first transistor and the fourth transistor; and logic. The logic may be configured to: identify a voltage value based on an input voltage at the input node; determine an emulated current for the inductive element based on an expression having a variable associated with a voltage across the flying capacitive element, wherein determining the emulated current comprises assuming the variable to have the voltage value; compare the emulated current to a threshold; and control at least one of the first transistor, the second transistor, the third transistor, or the fourth transistor based on the comparison.

Certain aspects of the present disclosure are directed toward an apparatus for operating a power supply circuit. The apparatus generally includes at least one memory and one or more processors coupled to the memory, the one or more processors being configured to: identify a voltage value based on an input voltage of a three-level buck converter; determine an emulated current for an inductive element of the three-level buck converter based on an expression having a variable associated with a voltage across a flying capacitive element of the three-level buck converter, wherein determining the emulated current comprises assuming the variable to have the voltage value; compare the emulated current to a threshold; and control at least one transistor of the three-level buck converter based on the comparison.

Certain aspects of the present disclosure are directed toward a method for operating a three-level buck converter. The method generally includes: identifying a voltage value based on an input voltage of the three-level buck converter; determining an emulated current for an inductive element of the three-level buck converter based on an expression having a variable associated with a voltage across a flying capacitive element of the three-level buck converter, wherein determining the emulated current comprises assuming the variable to have the voltage value; comparing the emulated current to a threshold; and controlling at least one transistor of the three-level buck converter based on the comparison.

Certain aspects of the present disclosure are directed towards an apparatus for operating a three-level buck converter. The apparatus generally includes: means for identifying a voltage value based on an input voltage of the three-level buck converter; means for determining an emulated current for an inductive element of the three-level buck converter based on an expression having a variable associated with a voltage across a flying capacitive element of the three-level buck converter, wherein means for determining the emulated current comprises means for assuming the variable to have the voltage value; means for comparing the emulated current to a threshold; and means for controlling at least one transistor of the three-level buck converter based on the comparison.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 is a flow diagram of example operations for supplying power, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
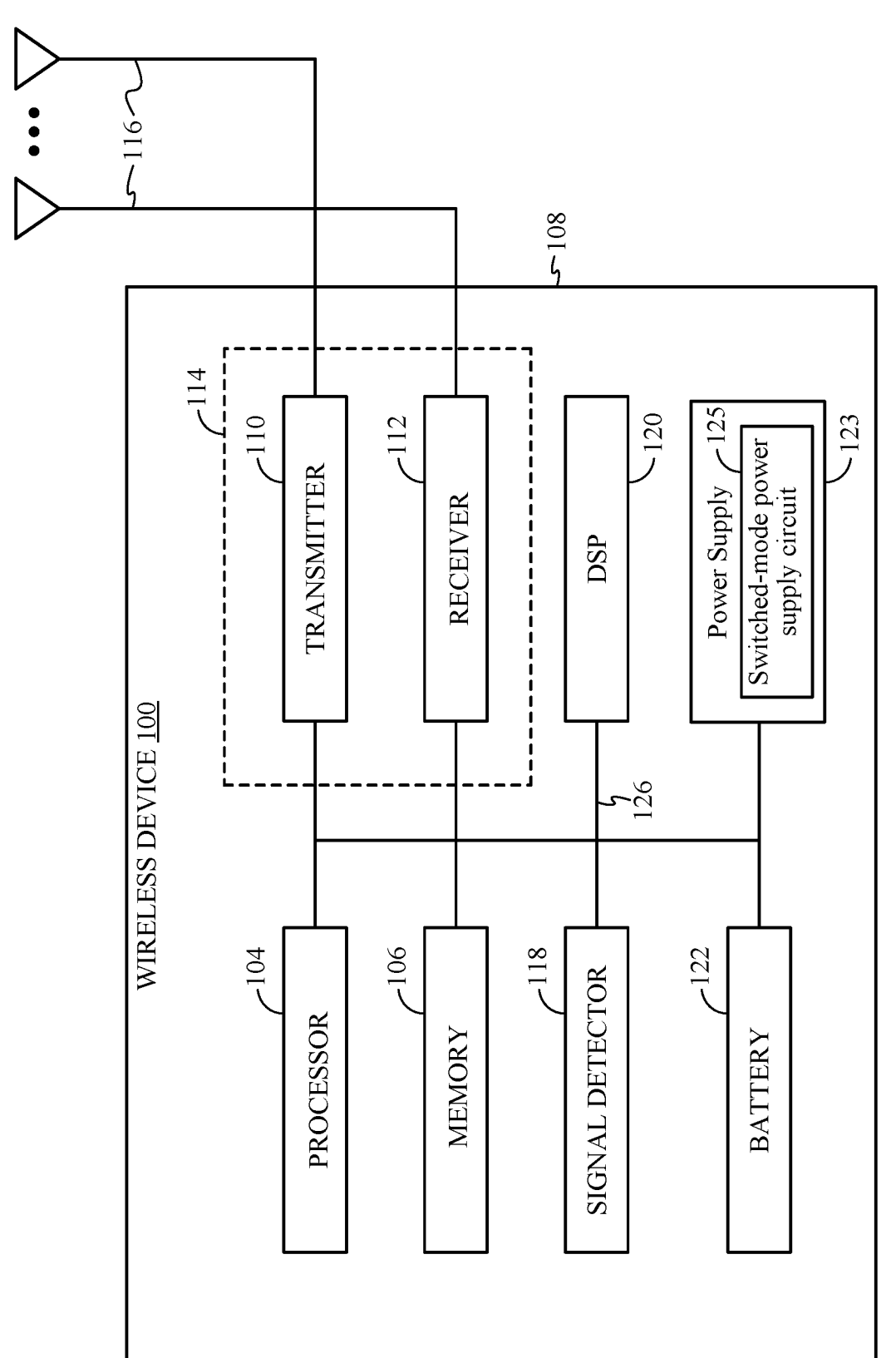
FIG. 1 illustrates a block diagram of an example device that includes a power supply system with at least one switched-mode power supply (SMPS) circuit, in which aspects of the present disclosure may be practiced.

Certain aspects of the present disclosure provide techniques and apparatus for operating a three-level buck converter. A three-level buck converter may include a flying capacitive element (CFLY) that may be charged and discharged during charging and discharging phases of the three-level buck converter. For efficient operation of the three-level buck converter, the voltage across CFLY (referred to herein as "VCFLY") should be half of the input voltage (VIN) of the three-level buck converter. Certain aspects of the present disclosure provide a feedback loop for implementing a peak current mode that increases the duration of the charging phase when VCFLY drops below VIN/2 and increases the duration of the discharging phase when VCFLY increases above VIN/2, such that VCFLY automatically tracks VIN/2, as described in more detail herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatuses, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, a virtual reality (VR) or augmented reality (AR) device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when the device is disconnected from an external power source). The device 100 may also include a power supply system 123 for managing the power from the battery (or from one or more power ports for receiving external power) to the various components of the device 100. At least a portion of the power supply system 123 may be implemented in one or more power management integrated circuits (power management ICs or PMICs) The power supply system 123 may perform a variety of functions for the device 100 such as DC-to-DC conversion, battery charging, power-source selection, voltage scaling, power sequencing, etc. For example, the power supply system 123 may include one or more power supply circuits, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit, which can switch between operating in a three-level buck converter mode and a two-level buck converter mode, as described below. In some cases, the power supply system 123 may include a battery charging circuit (e.g., a master-slave battery charging circuit) for charging the battery 122. The battery charging circuit may be implemented by the switched-mode power supply circuit 125, for example.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Scheme

Figure 2:
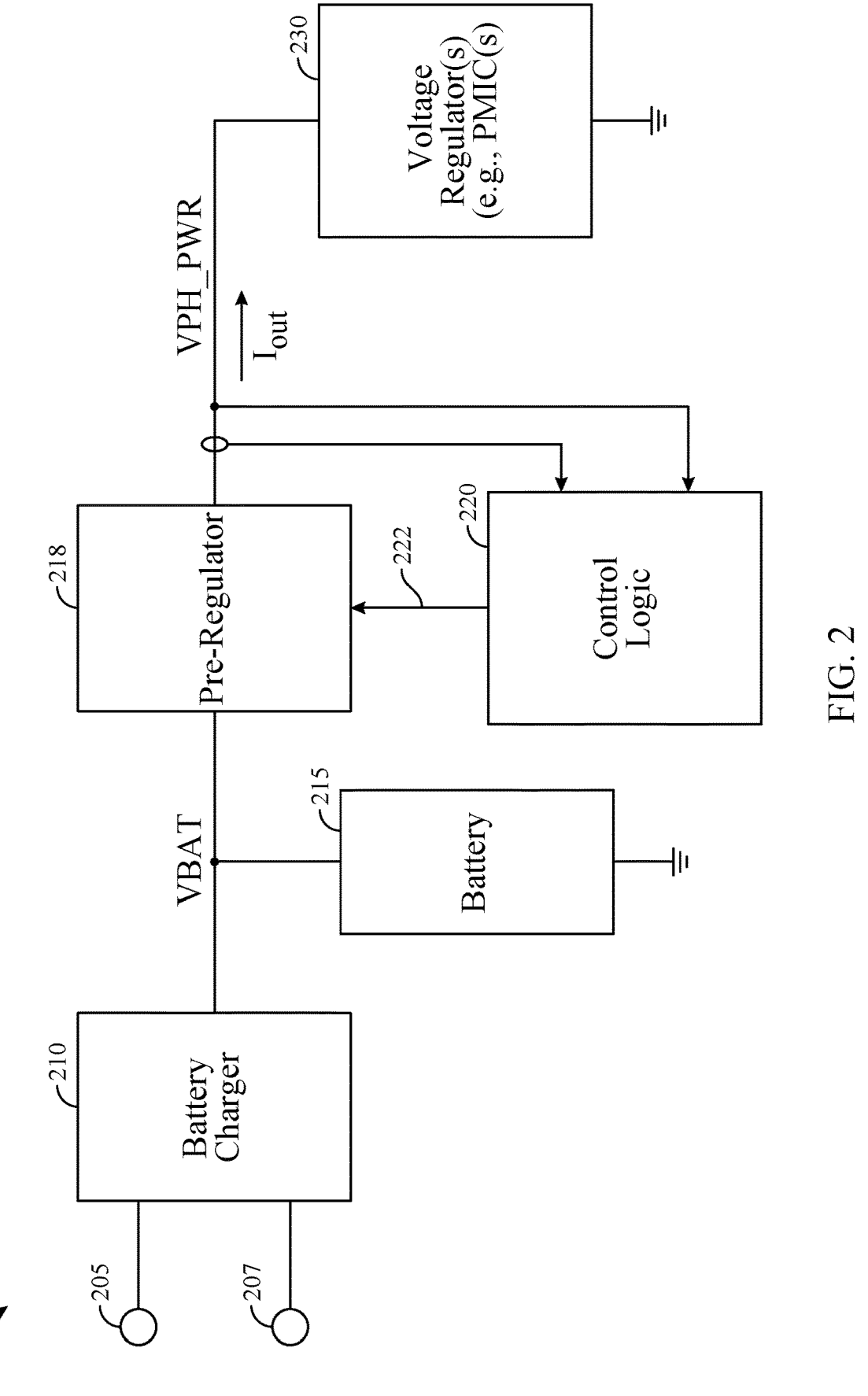
FIG. 2 is a block diagram of an example power supply scheme comprising a battery charging circuit, a battery circuit, and a pre-regulator for regulating power to one or more voltage regulators, in accordance with certain aspects of the present disclosure.

FIG. 2 is a block diagram of an example power supply scheme 200, in accordance with certain aspects of the present disclosure. The power supply scheme 200 includes a battery charging circuit 210, a battery circuit 215, a pre-regulator 218, and one or more voltage regulators 230. Control logic 220 may receive various inputs (e.g., voltage and/or current feedback signals) and may control the pre-regulator 218, the battery charging circuit 210, and/or the voltage regulators 230.

The battery charging circuit 210 may receive power from one or more ports (e.g., ports 205 and 207), and this received power may be converted and used to charge a battery or a battery pack in a battery circuit 215 of a portable device (e.g., a smartphone, tablet, and the like). For example, port 205 may be a Universal Serial Bus (USB) port for connecting to a wall adapter, whereas port 207 may be a wireless power port. The battery circuit 215 may include a single-cell or multi-cell-in-series battery (e.g., a two-cells-in-series, or 2S, battery). The battery circuit 215 may also include any protection circuitry, which may include switches implemented by transistors, for example. For certain aspects, the battery charging circuit 210, or at least a portion thereof, may reside in a PMIC in the device. The battery charging circuit 210 may comprise, for example, one or more switched-mode power supplies (e.g., a buck converter and/or a charge pump converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies, such as a three-level buck converter topology. However, one or more of the buck converters may be replaced with a charge pump converter in some parallel charging circuits.

The pre-regulator 218 may receive power from the battery with a voltage VBAT (e.g., 7 to 9 V). Used to regulate power for the voltage regulators 230, the pre-regulator 218 may comprise, for example, one or more switched-mode power supplies (e.g., a buck converter, a charge pump converter, or an adaptive combination power supply circuit capable of switching therebetween). As described below, the control logic 220 may receive an indication of a current associated with the pre-regulator 218 (e.g., output current $I_{out}$) and an indication of the output voltage VPH_PWR (e.g., 3.3 to 4 V) from the pre-regulator. Based, at least in part, on these indications, the control logic 220 may output one or more control signals 222 to control the pre-regulator 218. For example, in the case of a three-level buck converter topology, the control logic 220 may output signals as inputs to the gate drivers for driving the power transistors to regulate the output voltage VPH_PWR. The one or more voltage regulators 230 may include one or more linear regulators and/or one or more switching regulators for generating smaller voltages (e.g., 1.2 to 3.3 V) from VPH_PWR. For certain aspects, the voltage regulators 230 may include core PMICs for the device.

Example Power Supply Circuit and Operation

As described above, a pre-regulator (e.g., the pre-regulator 218) may be implemented by a switched-mode power supply (e.g., a buck converter, a charge pump converter, or an adaptive combination power supply circuit capable of switching therebetween), which may be a single-phase or multi-phase converter. For certain aspects, a three-level buck converter may be utilized to implement a pre-regulator.

Figure 3:
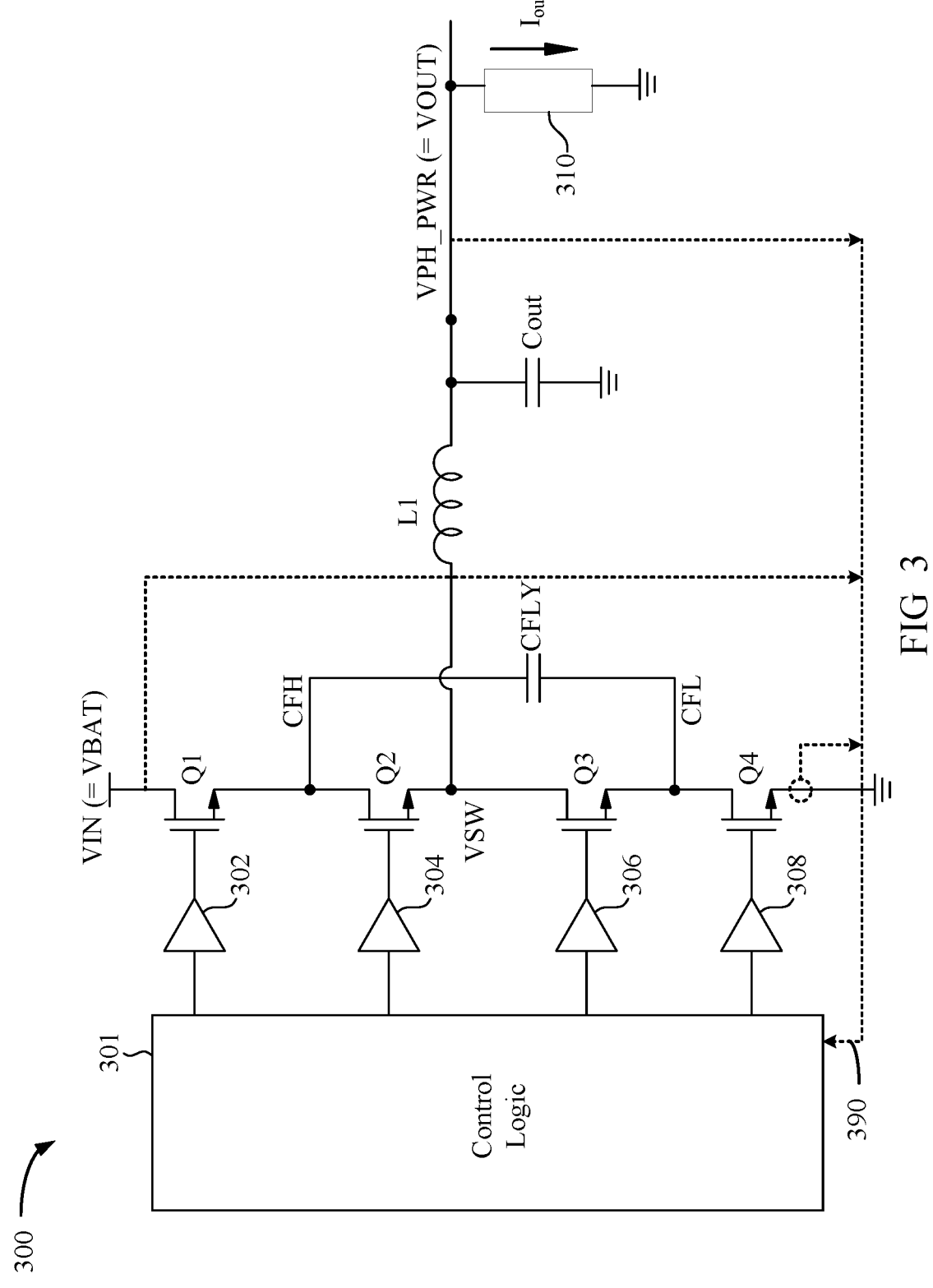
FIG. 3 is a circuit diagram of an example power supply circuit with a three-level buck converter, in accordance with certain aspects of the present disclosure.

A single-phase three-level buck converter topology (as illustrated in the power supply circuit 300 of FIG. 3) may include four switches (implemented by a first transistor Q1, a second transistor Q2, a third transistor Q3, and a fourth transistor Q4), a flying capacitive element CFLY, an inductive element L1, and one or more shunt capacitive elements (represented here by capacitor Cout). An output node (labeled "VPH_PWR" or "VOUT") of the power supply circuit 300 may be coupled to a shunt load 310. Output current $I_{out}$ of the power supply circuit 300 may pass through the shunt load 310, as is shown in FIG. 3.

Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 3. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electrical ground) for the power supply circuit 300. The flying capacitive element CFLY may have a first terminal coupled to the first node and a second terminal coupled to the third node. The inductive element L1 may have a first terminal coupled to the second node and a second terminal coupled to the output node (labeled "VPH_PWR," but also referred to as "VOUT"), the one or more shunt capacitive elements, and the shunt load 310.

Control logic 301 may control operation of the power supply circuit 300 and may be the same or different from control logic 220 in FIG. 2. For example, control logic 301 may control operation of the transistors Q1-Q4 via output signals to the inputs of respective gate drivers 302, 304, 306, and 308. The outputs of the gate drivers 302, 304, 306, and 308 are coupled to respective gates of transistors Q1-Q4. During operation of the power supply circuit 300, the control logic 301 may cycle through different phases, which may differ depending on whether the duty cycle of the power supply circuit is less than 50% or greater than 50%.

For certain aspects, the power supply circuit 300 may include a feedback loop 390. The feedback loop 390 may provide, as input to the control logic 301, one or more measured parameters such as VIN, VOUT, and a current across one or more transistors of the three-level buck converter (e.g., current across transistor Q4). The parameters from the feedback loop 390 may be used to control operations of the three-level buck converter, as described in more detail herein.

Operation of the power supply circuit 300 with a duty cycle of less than 50% is described first. In a first phase (referred to as a "charge phase"), transistors Q1 and Q3 are activated, and transistors Q2 and Q4 are deactivated, to charge the flying capacitive element CFLY and to energize the inductive element L1. In a second phase (called a "holding phase" or a "freewheeling phase"), transistor Q1 is deactivated, and transistor Q4 is activated, such that the VSW node is coupled to the reference potential node, the flying capacitive element CFLY is disconnected (e.g., one of the CFLY terminals is floating), and the inductive element L1 is deenergized. In a third phase (referred to as a "discharge phase"), transistors Q2 and Q4 are activated, and transistor Q3 is deactivated, to discharge the flying capacitive element CFLY and to energize the inductive element L1. In a fourth phase (also referred to as a "holding phase" or a "freewheeling phase"), transistor Q3 is activated, and transistor Q2 is deactivated, such that the flying capacitive element CFLY is disconnected and the inductive element L1 is deenergized.

Operation of the power supply circuit 300 with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "VIN," which in some cases may be a battery voltage node "VBAT"), the flying capacitive element CFLY is disconnected, and the inductive element L1 is energized. Similarly in the fourth phase (also referred to as a "holding phase") with a duty cycle greater than 50%, transistor Q1 is activated, and transistor Q4 is deactivated, such that the flying capacitive element CFLY is disconnected and the inductive element L1 is energized.

Example Pseudo-Emulated Peak Current Mode

Certain aspects of the present disclosure are directed toward techniques for controlling the charging and discharging of a flying capacitive element (CFLY) for a three-level buck converter. Charging and discharging phases may be controlled such that the voltage across CFLY (referred to herein as VCFLY) is half the input voltage (VIN) for the three-level buck converter. For example, certain aspects provide a feedback loop that increases the duration of the charging phase if VCFLY drops below VIN/2 and increases the duration of the discharging phase if VCFLY increases above VIN/2.

Figure 4A:
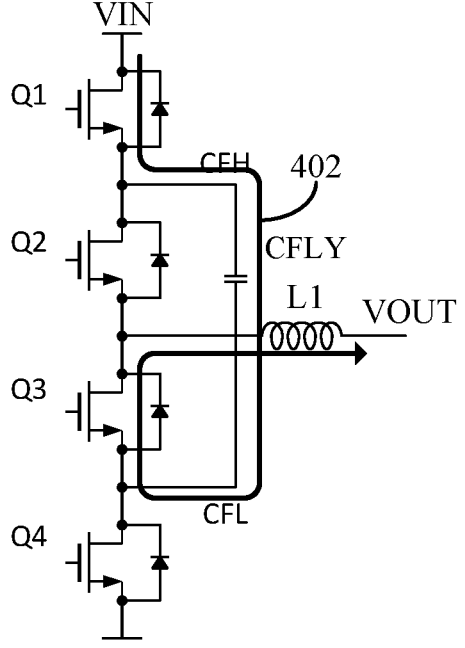
FIGS. 4A and 4B show current flow in a three-level buck converter during a charging phase and a discharging phase, respectively.
Figure 4B:
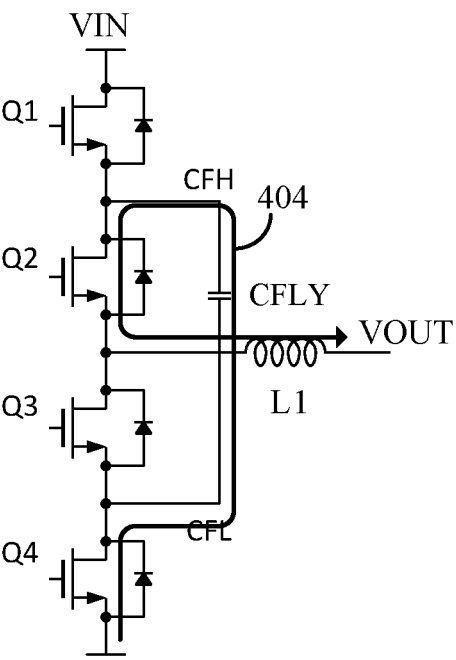

FIGS. 4A and 4B show current flow in a three-level buck converter during the charging and discharging phases, respectively. As shown, during the charging phase, transistors Q1 and Q3 are turned on, while transistors Q2 and Q4 are turned off. Current 402 flows from the VIN node across transistor Q1, across CFLY, across transistor Q3, across inductive element L1, and to the output voltage (VOUT) node. During the charging phase, the voltage across CFLY increases (e.g., CFLY charges). After the charging phase, a freewheeling phase occurs, during which transistors Q3 and Q4 are turned on, while transistors Q1 and Q2 are turned off, as described herein. After the freewheeling phase, the discharging phase occurs. During the discharging phase, transistors Q2 and Q4 are turned on, while transistors Q1 and Q3 are turned off. Current 404 flows from a reference potential node (e.g., electrical ground), across transistor Q4, across CFLY, across transistor Q2, across inductive element L1, and to the VOUT node. During the discharging phase, the voltage across CFLY decreases (e.g., CFLY discharges). After the discharging phase, another freewheeling phase occurs. These phases may be continuously repeated during operation of the three-level buck converter.

Figure 5:
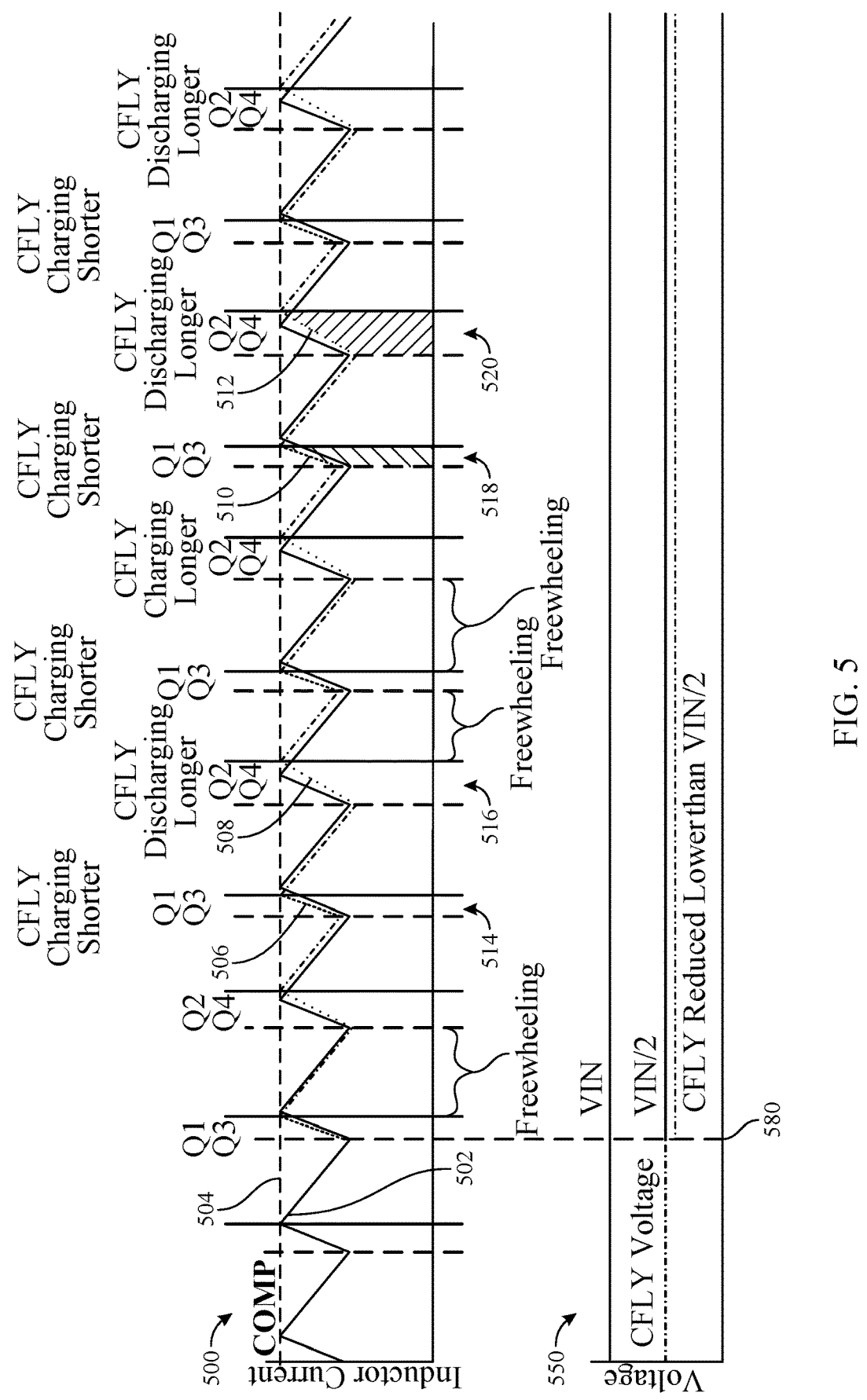
FIG. 5 illustrates timing diagrams showing inductor current and a voltage of a flying capacitive element (CFLY) for a three-level buck converter.

FIG. 5 illustrates a timing diagram 500 showing inductor current (e.g., current across inductive element L1) during different phases of a three-level buck converter and a timing diagram 550 showing a CFLY voltage (referred to herein as "VCFLY"). Curve 502 of timing diagram 500 shows the inductor current if VCFLY remains at half of VIN (VIN/2) and represents ideal operation of the three-level buck converter. During peak current mode, when the inductor current reaches a current comparison threshold 504 (labeled "COMP"), the three-level buck converter switches from either the charging phase (or the discharging phase) to the freewheeling phase. In this example, the inductor current is not allowed to exceed the current comparison threshold 504.

When the three-level buck converter is operating in peak current mode, the duration of the charging and discharging phases are dependent on VCFLY. For example, as shown in timing diagram 550, if VCFLY drops below VIN/2 (e.g., at time 580), the duration of the charging phase begins to decrease, and the duration of the discharging phase begins to increase because the inductor current slope (e.g., rate of increase of current across L1) increases during the charging phase and decreases during the discharging phase, in response to VCFLY dropping below VIN/2. For instance, the slope of the inductor current (represented by line 506) during the charging phase 514 is less than the slope of the inductor current (represented by line 510) during the later charging phase 518. The slope of the inductor current (represented by line 508) during the discharging phase 516 is greater than the slope of the inductor current (represented by line 512) during the later discharging phase 520. As a result, CFLY is discharged more than CFLY is charged, resulting in a further decrease of VCFLY. In other words, the three-level buck converter in this example operates with positive feedback.

To implement peak current mode, the inductor current may be sensed during the freewheeling phase (e.g., by sensing the current across transistor Q4 during the freewheeling phase). The inductor current at the end of the freewheeling phase may be sampled and held. A controller (e.g., control logic 301) may generate (e.g., calculate) an inductor current slope (e.g., ramp) during the charging or discharging phase. Based on the sampled inductor current at the end of the freewheeling phase and the inductor current slope, the controller identifies when the inductor current will reach the current comparison threshold 504 to switch from the charging or discharging phase back to the freewheeling phase. The inductor current slope during the charging phase (e.g., when the transistors Q1 and Q3 are on) may be calculated based on the expression:

$$\frac{VIN - VCFLY - VOUT}{L}$$

where VCFLY is the voltage across CFLY, VIN is the voltage at the VIN node, and VOUT is the voltage at the VOUT node of the three-level buck converter. As shown by the expression, if VCFLY decreases, the calculated inductor current slope increases, resulting in the shorter charging phase in response to VCFLY decreasing. The inductor current slope during the freewheeling phase (e.g., when the transistors Q3 and Q4 are on) may be calculated based on the expression:

$$\frac{VOUT}{L}$$

The inductor current slope during the discharging phase (e.g., when transistors Q2 and Q4 are on) may be calculated based on the expression:

$$\frac{VCFLY - VOUT}{L}$$

As shown by the expression, during the discharging phase, if VCFLY decreases, the calculated inductor current slope decreases, resulting in the longer discharging phase in response to VCFLY decreasing. In other words, positive feedback exists between VCFLY and the duration of the discharging phase, resulting in a further decrease in VCFLY.

Certain aspects of the present disclosure are directed to a feedback loop (e.g., feedback loop 390) for controlling the three-level buck converter such that VCFLY tracks VIN/2.

In some aspects of the present disclosure, the inductor current slope for the charging and discharging phase may be calculated assuming a constant value (e.g., VIN/2) for VCFLY. For instance, VCFLY may be assumed to be VIN/2 when calculating the slope for the charging phase or the discharging phase. The inductor current slope during the charging phase may be calculated based on the expression:

$$\frac{VIN - \dfrac{VIN}{2} - VOUT}{L}$$

Moreover, the inductor current slope during the discharging phase may be calculated based on the expression:

$$\frac{\dfrac{VIN}{2} - VOUT}{L}$$

By using VIN/2 for VCFLY (e.g., instead of the actual voltage across CFLY), VCFLY may automatically track VIN/2. For example, if VCFLY drops below VIN/2, the duration of the charging phase may become greater than the duration of the discharging phase, resulting in VCFLY increasing back to VIN/2. Similarly, if VCFLY increases above VIN/2, the duration of the discharging phase will become greater than the duration of the charging phase, resulting in VCFLY decreasing back to VIN/2. Thus, negative feedback now exists between VCFLY and the duration of the discharging phase, resulting in VCFLY automatically correcting back to VIN/2. Furthermore, this automatic correction occurs without using a balance circuit in the three-level buck converter, which would consume area and power.

Figure 6:
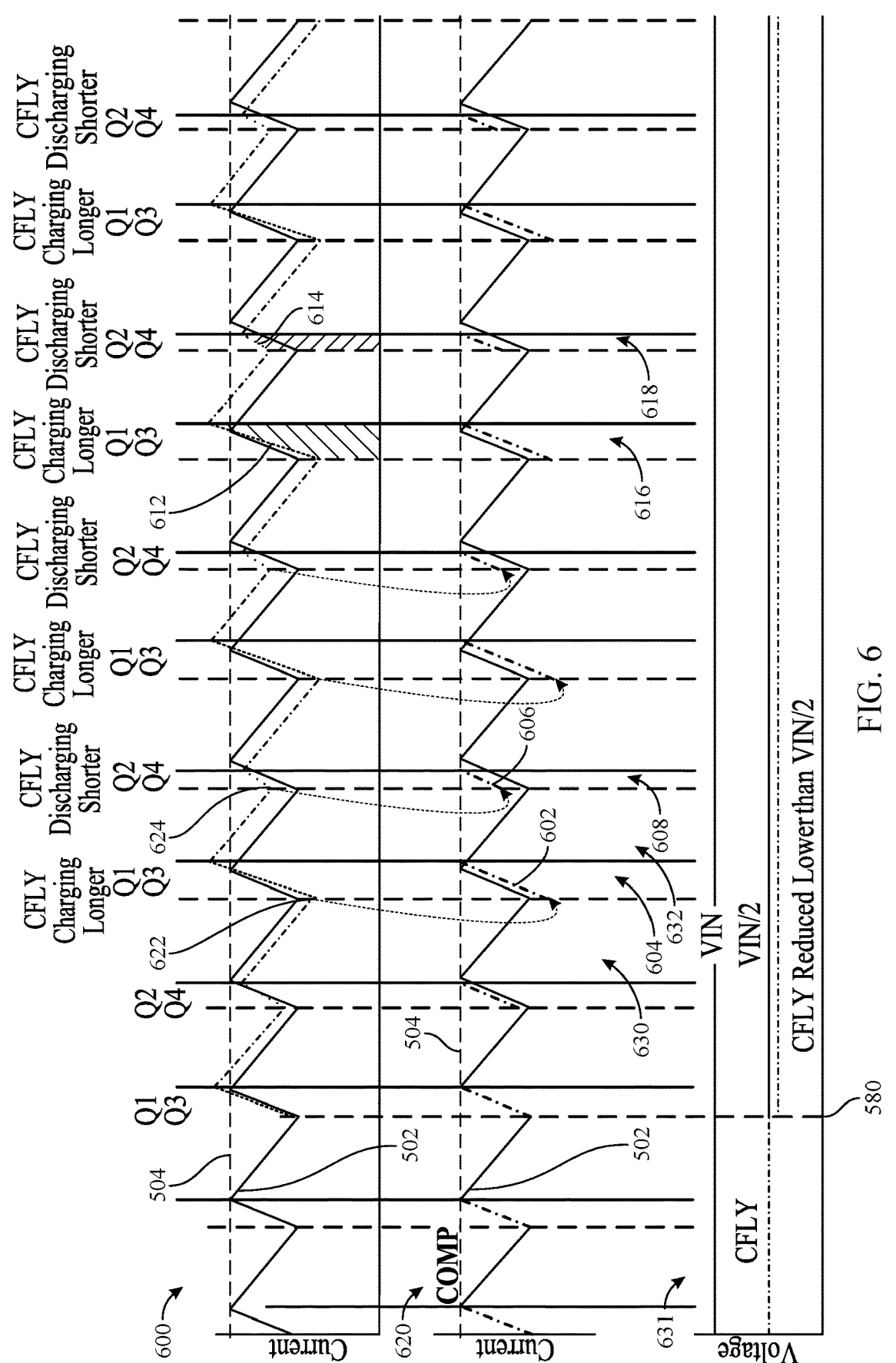
FIG. 6 illustrates timing diagrams showing inductor current during different phases of a three-level buck converter, emulated inductor current slopes during the different phases, and a CFLY voltage, in accordance with certain aspects of the present disclosure.

FIG. 6 illustrates a timing diagram 600 showing inductor current during different phases of a three-level buck converter and a timing diagram 620 showing emulated inductor current slopes during the different phases, in accordance with certain aspects of the present disclosure. Also referred to as an "emulated ramp," an emulated inductor current slope refers to a slope calculated by assuming VCFLY is VIN/2, as described. FIG. 6 also illustrates a timing diagram 631 showing VCFLY. As shown by timing diagram 620, the controller (e.g., control logic 301) may calculate an emulated inductor current slope for each of the charging and discharging phases in this pseudo-emulated peak current mode. For example, during charging phase 604, an emulated inductor current slope 602 is calculated. The transition from the charging phase 604 to a subsequent freewheeling phase may be determined based on the emulated inductor current slope 602, the inductor current 622 at the end of the freewheeling phase 630, and the current comparison threshold 504, as shown. During the discharging phase 608, an emulated inductor current slope 606 is calculated. The transition from the discharging phase 608 to a subsequent freewheeling phase may be determined based on the emulated inductor current slope 606, the inductor current 624 at the end of the freewheeling phase 632, and the current comparison threshold 504, as shown. The emulated ramp starting point is determined by performing current sensing for transistors Q4 (e.g., sensing current across transistor Q4) during the freewheeling phase, as shown. The slope of the emulated ramps may be the same during the charging and discharging phases, but the starting point may be different for each emulated ramp.

Since an emulated inductor current slope is used (e.g., assuming VCFLY is VIN/2) to determine the transition from the charging phase, the actual inductor currents during the charging phases may begin to overshoot the current comparison threshold 504 after VCFLY drops below VIN/2 at time 580, as shown by timing diagram 600. For example, inductor current 612 during the charging phase 616 may overshoot the current comparison threshold 504 (e.g., resulting in an increase in the duration of the charging phase and an increase of VCFLY), as shown. Moreover, since an emulated slope is used (e.g., assuming a constant value for CFLY) to determine the transition from the discharging phase, the actual inductor currents during the discharging phases may begin to undershoot the current comparison threshold 504 after VCFLY drops below VIN/2 at time 580. For example, inductor current 614 during the discharging phase 618 may undershoot the current comparison threshold 504, as shown.

While the pseudo-emulated peak current mode is described with respect to VCFLY dropping below VIN/2 to facilitate understanding, the pseudo-emulated peak current mode also provides for VCFLY correction back to VIN/2 when the VCFLY increases over VIN/2. For example, if VCFLY is greater than VIN/2, the duration of the discharging phase may increase, and the duration of the charging phase may decrease, resulting in VCFLY dropping back to VIN/2. In other words, VCFLY may continuously track VIN/2. The techniques described with respect to FIG. 6 may be applied when the duty ratio (e.g., VOUT/VIN) of the three-level buck converter is less than 50%.

Figure 7:
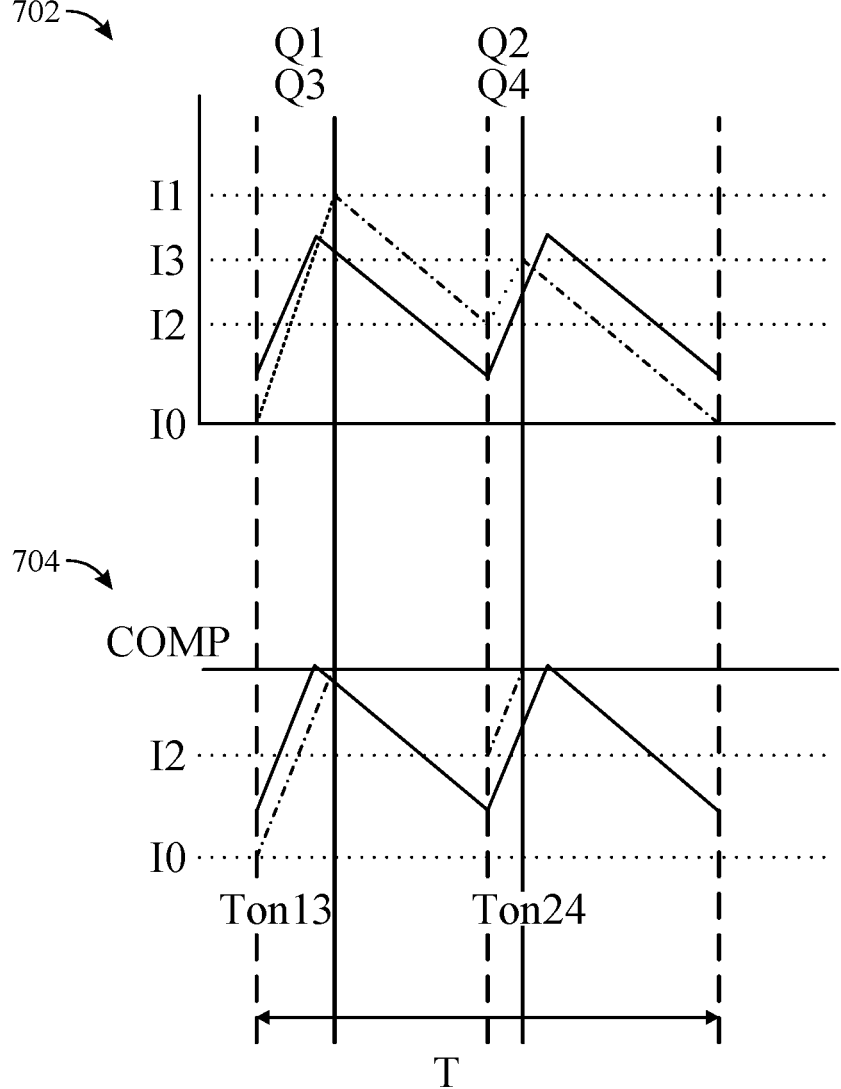
FIG. 7 illustrates durations associated with different phases of a three-level buck converter, in accordance with certain aspects of the present disclosure.

FIG. 7 illustrates durations associated with different phases of a three-level buck converter, in accordance with certain aspects of the present disclosure. Diagram 702 shows the inductor current during different phases of a three-level buck converter and a timing diagram 704 showing emulated inductor current slopes during the different phases. FIG. 7 shows the duration (e.g., on time, labeled "Ton13") of the charging phase (e.g., during which transistors Q1, Q3 are turned on) and the duration (e.g., on time, labeled "Ton24") of the discharging phase (e.g., during which transistors Q2, Q4 are turned on). As shown by diagram 702, at the beginning of the charging phase, the inductor current may be I0 and increases to I1 until the end of the charging phase. During the subsequent freewheeling phase, the inductor current drops to I2. During the subsequent discharging phase, the inductor current increases to I3. After the discharging phase, another freewheeling phase begins during which the inductor drops to I0. The inductor currents I0, I1, I2, and I3 may be calculated based on the following equations:

$$I1 = I0 + \frac{VIN - \left(\frac{VIN}{2} + VC\right) - VOUT}{L} \times Ton13$$

$$I2 = I1 - \frac{VOUT}{L} \times \left(\frac{T}{2} \times Ton13\right)$$

$$I3 = I2 + \frac{\frac{VIN}{2} + VC - VOUT}{L} \times Ton24$$

$$I0 = I3 + \frac{VOUT}{L} \times \left(\frac{T}{2} \times Ton24\right)$$

where VC is the current comparison threshold 504 for the peak-current mode of the three-level buck converter and T is the total duration for a cycle including a charging phase, a first freewheeling phase, a discharging phase, and a second freewheeling phase, as shown in timing diagram 704. Ton13 and Ton24 may be calculated based on the following equations:

$$Ton24 = \frac{\frac{VOUT}{2} \cdot T \cdot \left(\frac{VIN}{2} - VC\right) - VOUT \cdot T \cdot (VOUT - VC)}{VC^2 + \frac{VIN^2}{4} - VIN \cdot VOUT}$$

12

-continued $$Ton13 = \frac{VOUT \cdot T - Ton24 \cdot \left(\frac{VIN}{2} + VC\right)}{\frac{VIN}{2} - VC}$$

The techniques described herein result in VCFLY tracking VIN/2 without a balancing circuit, reducing silicon area and increasing power efficiency as compared to conventional implementations. Using the techniques described herein, inrush current (e.g., associated with conventional balancing circuits) may be reduced. Both transistors Q1 and Q2 on duration (e.g., durations of charging and discharging phases) may be controlled by the same feedback loop (e.g., feedback loop 390), providing a faster transient response as compared to conventional implementations.

The pseudo-emulated peak current mode described herein provides for the generation of an artificial slope (e.g., for controlling charging and discharging phases) using the same resource (e.g., using sample and hold of the current across transistor Q4 during the freewheeling phase). Thus, the same current sensing circuit may be used for generating the current slope for both the charging and the discharging phases. The techniques described facilitate the matching of the duty cycle of transistors Q1 and Q2 (e.g., duty cycles associated with the charging and discharging phases) when VCFLY is at VIN/2.

FIG. 8 is a flow diagram illustrating example operations 800 for operating a three-level buck converter. The operations 800 may be performed by a power supply circuit (e.g., the power supply circuit 300 of FIG. 3) having a three-level buck converter and logic (e.g., the control logic 301) configured to control the switching scheme in the three-level buck converter.

At block 802, the power supply circuit may identify a voltage value based on an input voltage (e.g., VIN shown in FIG. 3) of the three-level buck converter. For example, the voltage value may be half the input voltage.

At block 804, the power supply circuit determines an emulated current for an inductive element (e.g., inductive element L1 of FIG. 3) of the three-level buck converter based on an expression having a variable associated with a voltage across a flying capacitive element (e.g., CFLY shown in FIG. 3) of the three-level buck converter. Determining the emulated current may include determining an emulated current slope (e.g., inductor current slope 602 or inductor current slope 606). Determining the emulated current may include assuming the variable to have the voltage value. The emulated current may be further determined based on a current (e.g., inductor current 622 or inductor current 624) at an end of a freewheeling phase (e.g., freewheeling phase 630 or freewheeling phase 632) of the three-level buck converter. The emulated current may be determined for a charging phase (e.g., charging phase 604) of the three-level buck converter. In some aspects, the emulated current is determined for a discharging phase (e.g., discharging phase 608) of the three-level buck converter. In some aspects, the emulated current is determined based on the input voltage and an output voltage (VOUT shown in FIG. 3) for the three-level buck converter.

At block 806, the power supply circuit compares (e.g., via the control logic 301 of FIG. 3) the emulated current to a threshold (e.g., current comparison threshold 504). At block 808, the power supply circuit controls at least one transistor (e.g., one or more of transistors Q1, Q2, Q3, Q4) of the three-level buck converter based on the comparison. Controlling the at least one transistor may include transitioning the three-level buck converter from a charging phase (e.g., charging phase 604) or a discharging phase (e.g., discharging phase 608) to a freewheeling phase based on the emulated current reaching the threshold.

Example Aspects

In addition to the various aspects described above, specific combinations of aspects are within the scope of the disclosure, some of which are detailed below:

Aspect 1: A power supply circuit, comprising: a first transistor and a second transistor coupled between an input node of the power supply circuit and a switching node of the power supply circuit, the switching node being coupled to an inductive element; a third transistor and a fourth transistor coupled between a reference potential node of the power supply circuit and the switching node of the power supply circuit; a flying capacitive element coupled between the first transistor and the fourth transistor; and logic configured to: identify a voltage value based on an input voltage at the input node; determine an emulated current for the inductive element based on an expression having a variable associated with a voltage across the flying capacitive element, wherein determining the emulated current comprises assuming the variable to have the voltage value; compare the emulated current to a threshold; and control at least one of the first transistor, the second transistor, the third transistor, or the fourth transistor based on the comparison.

Aspect 2: The power supply circuit of Aspect 1, wherein the logic is configured to determine the emulated current based on the input voltage and an output voltage for the power supply circuit.

Aspect 3: The power supply circuit of Aspect 1 or 2, wherein the voltage value is half the input voltage.

Aspect 4: The power supply circuit according to any of Aspects 1-3, wherein, to determine the emulated current, the logic is configured to determine an emulated current slope.

Aspect 5: The power supply circuit of Aspect 4, wherein the logic is configured to determine the emulated current further based on a current at an end of a freewheeling phase of the power supply circuit.

Aspect 6: The power supply circuit of Aspect 5, wherein the logic is configured to turn on the third transistor and the fourth transistor during the freewheeling phase.

Aspect 7: The power supply circuit according to any of Aspects 1-6, wherein the logic is configured to determine the emulated current for a charging phase of the power supply circuit.

Aspect 8: The power supply circuit of Aspect 7, wherein the logic is configured to turn on the first transistor and the third transistor during the charging phase.

Aspect 9: The power supply circuit according to any of Aspects 1-8, wherein the logic is configured to determine the emulated current for a discharging phase of the power supply circuit.

Aspect 10: The power supply circuit of Aspect 9, wherein the logic is configured to turn on the second transistor and the fourth transistor during the discharging phase.

Aspect 11: The power supply circuit according to any of Aspects 1-10, wherein, to control the at least one of the first transistor, the second transistor, the third transistor, or the fourth transistor, the logic is configured to transition the power supply circuit from a charging phase or a discharging phase to a freewheeling phase based on the emulated current reaching the threshold.

Aspect 12: The power supply circuit according to any of Aspects 1-11, wherein a ratio of an output voltage for the power supply circuit and the input voltage is less than 50%.

Aspect 13: An apparatus for operating a power supply circuit, comprising: at least one memory; and one or more processors coupled to the memory, the one or more processors being configured to: identify a voltage value based on an input voltage of a three-level buck converter; determine an emulated current for an inductive element of the three-level buck converter based on an expression having a variable associated with a voltage across a flying capacitive element of the three-level buck converter, wherein determining the emulated current comprises assuming the variable to have the voltage value; compare the emulated current to a threshold; and control at least one transistor of the three-level buck converter based on the comparison.

Aspect 14: The apparatus of Aspect 13, wherein the one or more processors are configured to determine the emulated current based on the input voltage and an output voltage for the three-level buck converter.

Aspect 15: The apparatus of Aspect 13 or 14, wherein the voltage value is half the input voltage.

Aspect 16: The apparatus according to any of Aspects 13-15, wherein, to determine the emulated current, the one or more processors are configured to determine an emulated current slope.

Aspect 17: The apparatus of Aspect 16, wherein the one or more processors are configured to determine the emulated current further based on a current at an end of a freewheeling phase of the power supply circuit.

Aspect 18: The apparatus according to any of Aspects 13-17, wherein the one or more processors are configured to determine the emulated current for a charging phase of the power supply circuit.

Aspect 19: The apparatus according to any of Aspects 13-18, wherein the one or more processors are configured to determine the emulated current for a discharging phase of the power supply circuit.

Aspect 20: The apparatus according to any of Aspects 13-19, wherein, to control the at least one transistor, the one or more processors are configured to transition the three-level buck converter from a charging phase or a discharging phase to a freewheeling phase based on the emulated current reaching the threshold.

Aspect 21: The apparatus according to any of Aspects 13-20, wherein a ratio of an output voltage for the power supply circuit and the input voltage is less than 50%.

Aspect 22: A method for operating a three-level buck converter, comprising: identifying a voltage value based on an input voltage of the three-level buck converter; determining an emulated current for an inductive element of the three-level buck converter based on an expression having a variable associated with a voltage across a flying capacitive element of the three-level buck converter, wherein determining the emulated current comprises assuming the variable to have the voltage value; comparing the emulated current to a threshold; and controlling at least one transistor of the three-level buck converter based on the comparison.

Aspect 23: The method of Aspect 22, wherein the emulated current is determined based on the input voltage and an output voltage for the three-level buck converter.

Aspect 24: The method of Aspect 22 or 23, wherein the voltage value is half the input voltage.

Aspect 25: The method according to any of Aspects 22-24, wherein determining the emulated current comprises determine an emulated current slope.

Aspect 26: The method of Aspect 25, wherein the emulated current is further determined based on a current at an end of a freewheeling phase of the three-level buck converter.

Aspect 27: The method according to any of Aspects 22-26, wherein the emulated current is determined for a charging phase of the three-level buck converter.

Aspect 28: The method according to any of Aspects 22-27, wherein the emulated current is determined for a discharging phase of the three-level buck converter.

Aspect 29: The method according to any of Aspects 22-28, wherein controlling the at least one transistor comprises transitioning the three-level buck converter from a charging phase or a discharging phase to a freewheeling phase based on the emulated current reaching the threshold.

Aspect 30: An apparatus for operating a three-level buck converter, comprising: means for identifying a voltage value based on an input voltage of the three-level buck converter; means for determining an emulated current for an inductive element of the three-level buck converter based on an expression having a variable associated with a voltage across a flying capacitive element of the three-level buck converter, wherein the means for determining the emulated current is configured to assume the variable to have the voltage value; means for comparing the emulated current to a threshold; and means for controlling at least one transistor of the three-level buck converter based on the comparison.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In some aspects, means for identifying a voltage value, means for determining an emulated current, means for assuming, means for comparing an emulated current to a threshold, and means for controlling at least one transistor may include logic, such as the control logic 301.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit, comprising:
a first transistor and a second transistor coupled between an input node of the power supply circuit and a switching node of the power supply circuit, the switching node being coupled to an inductive element;
a third transistor and a fourth transistor coupled between a reference potential node of the power supply circuit and the switching node of the power supply circuit;
a flying capacitive element coupled between the first transistor and the fourth transistor; and
logic configured to:
identify a voltage value based on an input voltage at the input node;
determine an emulated current for the inductive element based on an expression having a variable associated with a voltage across the flying capacitive element, wherein determining the emulated current comprises assuming the variable to have the voltage value;
compare the emulated current to a threshold; and
control at least one of the first transistor, the second transistor, the third transistor, or the fourth transistor based on the comparison.

2. The power supply circuit of claim 1, wherein the logic is configured to determine the emulated current based on the input voltage and an output voltage for the power supply circuit.

3. The power supply circuit of claim 1, wherein the voltage value is half the input voltage.

4. The power supply circuit of claim 1, wherein, to determine the emulated current, the logic is configured to determine an emulated current slope.

5. The power supply circuit of claim 4, wherein the logic is configured to determine the emulated current further based on a current at an end of a freewheeling phase of the power supply circuit.

6. The power supply circuit of claim 5, wherein the logic is configured to turn on the third transistor and the fourth transistor during the freewheeling phase.

7. The power supply circuit of claim 1, wherein the logic is configured to determine the emulated current for a charging phase of the power supply circuit.

8. The power supply circuit of claim 7, wherein the logic is configured to turn on the first transistor and the third transistor during the charging phase.

9. The power supply circuit of claim 1, wherein the logic is configured to determine the emulated current for a discharging phase of the power supply circuit.

10. The power supply circuit of claim 9, wherein the logic is configured to turn on the second transistor and the fourth transistor during the discharging phase.

11. The power supply circuit of claim 1, wherein, to control the at least one of the first transistor, the second transistor, the third transistor, or the fourth transistor, the logic is configured to transition the power supply circuit from a charging phase or a discharging phase to a freewheeling phase based on the emulated current reaching the threshold.

12. The power supply circuit of claim 1, wherein a ratio of an output voltage for the power supply circuit and the input voltage is less than 50%.

13. An apparatus for operating a power supply circuit, comprising:

at least one memory; and one or more processors coupled to the memory, the one or more processors being configured to:

identify a voltage value based on an input voltage of a three-level buck converter;

determine an emulated current for an inductive element of the three-level buck converter based on an expression having a variable associated with a voltage across a flying capacitive element of the three-level buck converter, wherein determining the emulated current comprises assuming the variable to have the voltage value;

compare the emulated current to a threshold; and control at least one transistor of the three-level buck converter based on the comparison.

14. The apparatus of claim 13, wherein the one or more processors are configured to determine the emulated current based on the input voltage and an output voltage for the three-level buck converter.

15. The apparatus of claim 13, wherein the voltage value is half the input voltage.

16. The apparatus of claim 13, wherein, to determine the emulated current, the one or more processors are configured to determine an emulated current slope.

17. The apparatus of claim 16, wherein the one or more processors are configured to determine the emulated current further based on a current at an end of a freewheeling phase of the power supply circuit.

18. The apparatus of claim 13, wherein the one or more processors are configured to determine the emulated current for a charging phase of the power supply circuit.

19. The apparatus of claim 13, wherein the one or more processors are configured to determine the emulated current for a discharging phase of the power supply circuit.

20. The apparatus of claim 13, wherein, to control the at least one transistor, the one or more processors are configured to transition the three-level buck converter from a charging phase or a discharging phase to a freewheeling phase based on the emulated current reaching the threshold.

21. The apparatus of claim 13, wherein a ratio of an output voltage for the power supply circuit and the input voltage is less than 50%.

22. A method for operating a three-level buck converter, comprising:

identifying a voltage value based on an input voltage of the three-level buck converter;

determining an emulated current for an inductive element of the three-level buck converter based on an expression having a variable associated with a voltage across a flying capacitive element of the three-level buck converter, wherein determining the emulated current comprises assuming the variable to have the voltage value;

comparing the emulated current to a threshold; and controlling at least one transistor of the three-level buck converter based on the comparison.

23. The method of claim 22, wherein the emulated current is determined based on the input voltage and an output voltage for the three-level buck converter.

24. The method of claim 22, wherein the voltage value is half the input voltage.

25. The method of claim 22, wherein determining the emulated current comprises determine an emulated current slope.

26. The method of claim 25, wherein the emulated current is further determined based on a current at an end of a freewheeling phase of the three-level buck converter.

27. The method of claim 22, wherein the emulated current is determined for a charging phase of the three-level buck converter.

28. The method of claim 22, wherein the emulated current is determined for a discharging phase of the three-level buck converter.

29. The method of claim 22, wherein controlling the at least one transistor comprises transitioning the three-level buck converter from a charging phase or a discharging phase to a freewheeling phase based on the emulated current reaching the threshold.

30. An apparatus for operating a three-level buck converter, comprising:

means for identifying a voltage value based on an input voltage of the three-level buck converter;

means for determining an emulated current for an inductive element of the three-level buck converter based on an expression having a variable associated with a voltage across a flying capacitive element of the three-level buck converter, wherein the means for determining the emulated current is configured to assume the variable to have the voltage value;

means for comparing the emulated current to a threshold; and means for controlling at least one transistor of the three-level buck converter based on the comparison.

* * * * *